G. S. JOHNSON.
POWER TRANSMITTING MECHANISM.
APPLICATION FILED DEC. 15, 1911.
1,042,005.
Patented Oct. 22, 1912.
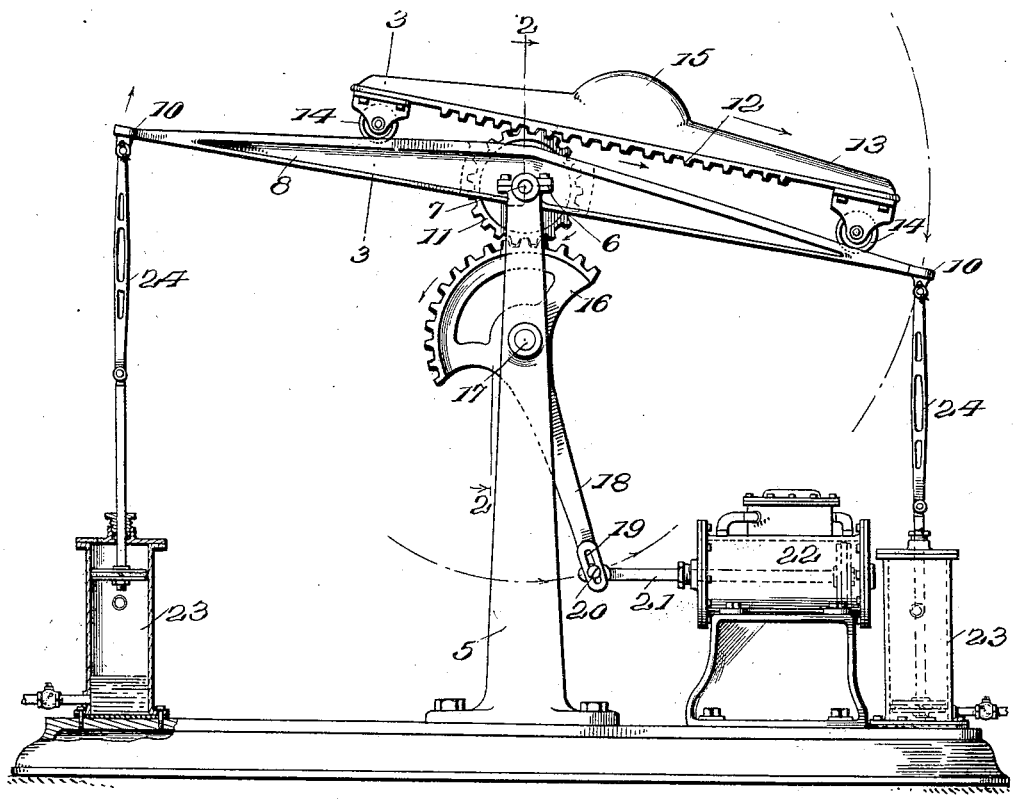
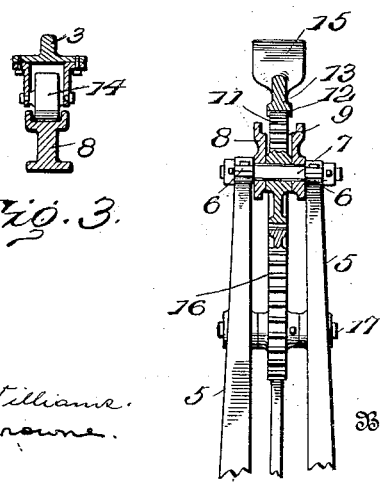
Witnesses
W. A. Williams.
Dudley Browne.
Inventor
G. S. Johnson.
By Brown & Phelps
Attorneys

UNITED STATES PATENT OFFICE.

GEORGE S. JOHNSON, OF WASHINGTON, DISTRICT OF COLUMBIA, ASSIGNOR OF FORTY-NINE ONE-HUNDREDTHS TO JAMES P. ROOTS, OF WASHINGTON, DISTRICT OF COLUMBIA.

POWER-TRANSMITTING MECHANISM.

1,042,005.

Specification of Letters Patent. Patented Oct. 22, 1912.

Application filed December 15, 1911. Serial No. 666,027.

*To all whom it may concern:*

Be it known that I, GEORGE S. JOHNSON, a citizen of the United States, residing at Washington, District of Columbia, have invented certain new and useful Improvements in Power-Transmitting Mechanism, of which the following is a specification.

My invention relates to certain new and useful improvements in mechanism for transmitting power.

The object of my invention is to produce a mechanism of this character which shall be simple in construction and have a high degree of efficiency.

With these and other objects in view my invention consists in certain constructions, combinations and arrangements of parts, the preferred form of which will be first described in connection with the accompanying drawings, and then the invention particularly pointed out in the appended claims.

Referring to the drawings wherein the same part is designated by the same reference numeral wherever it occurs, Figure 1 is a side elevation, partly in section, of the preferred embodiment of my invention; Fig. 2 is a section on line 2, 2 of Fig. 1, looking in the direction of the arrow, and Fig. 3 is a section on line 3, 3 of Fig. 1.

5 designates a vertical pillar provided at its upper end with a bearing 6 for the shaft 7, on which is centrally pivoted the walking-beam 8, which is triangular in form, with the apex of the triangle above the shaft 7. This walking beam may be of any desired construction, that illustrated being in the form of two separated triangular bars suitably connected together as indicated at 10, 10. Loosely journaled on the shaft 7, between the bars 9 of the walking beam 8, is a gear 11 adapted to mesh with a rack 12 of a truck 13 provided with wheels 14, 14 at its ends, said wheels running upon the top of the walking beam, the truck being of such a length that the wheels at one end of the truck will always remain at one side of the apex of the walking beam, while the other wheels will always remain at the other side thereof. This truck is preferably weighted as shown at 15.

From the construction so far described it will be evident that when the truck is in the position indicated in Fig. 1 it will tend to force down the right hand end of the walking beam as this figure is viewed, and when the truck is moved to the opposite end of the walking beam it will tend to force down that end. It will further be noted that because of the angle between the two sides of the top portion of the walking beam that the incline up which the walls moving toward the center of the walking beam have to run is quite slight, and that the wheels moving away from the center of the walking-beam do not have any incline to ascend. In order to rotate the gear 11 and consequently oscillate the truck from one side to the other to oscillate the walking beam, I have shown a sector 16 pivoted at 17 in the pillar 5, said sector meshing with the gear 11 and provided with an arm 18 having a slot 19 engaged by a pin 20 carried by the piston rod 21 of a steam or other engine 22.

It will be seen that as the piston 21 of the engine is reciprocated it will, through the operation of the sector 16, and gear 11, reciprocate the truck and cause the walking beam to oscillate about its center. The ends of the walking beam may be connected to any suitable mechanism which it is desired to drive, it being shown for the sake of illustration as connected to a pair of pumps 23, 23, by means of connecting rods 24 connected to the cross bars 10 of the walking beam.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a power-transmitting mechanism the combination with a walking-beam, of a truck mounted for movement along the walking-beam, and means for moving the truck longitudinally of the walking-beam and to each side of its center of oscillation.

2. Power-transmitting mechanism with a walking-beam having its upper surfaces formed at an angle to each other with the apex of the angle over the pivot of the walking beam, a truck having supporting wheels at each end thereof, one of said wheels being adapted to run on one of said angular surfaces and the other on the other, and means for moving the truck longitudinally of the walking beam.

3. The combination with a walking-beam, of a shaft on which said walking-beam is pivoted, a gear mounted on said shaft for movement independent of the walking beam, a truck mounted on the walking-beam and adapted to move longitudinally thereof, a rack carried by the truck adapted to be engaged by said gear, and means for rotating said gear.

In testimony whereof I affix my signature in presence of two witnesses.

GEORGE S. JOHNSON.

Witnesses:
DUDLEY BROWNE,
GEO. S. LIVINGSTON.

Copies of this patent may be obtained for five cents each, by addressing the "Commissioner of Patents, Washington, D. C."